Patented May 29, 1923.

1,456,702

UNITED STATES PATENT OFFICE.

HOWARD W. MATHESON, OF MONTREAL, QUEBEC, CANADA, ASSIGNOR TO SHAWINIGAN LABORATORIES LIMITED, OF MONTREAL, CANADA.

PROCESS OF MAKING ALDEHYDE AMMONIA.

No Drawing.    Application filed September 17, 1920.   Serial No. 410,935.

*To all whom it may concern:*

Be it known that I, HOWARD W. MATHESON, a subject of the King of Great Britain, and resident of the city of Montreal, in the Province of Quebec and Dominion of Canada, have invented certain new and useful Improvements in Processes of Making Aldehyde Ammonia, of which the following is a full, clear, and exact description.

This invention relates to improvements in a method or process of making an aldehyde ammonia, and the object of the invention is to provide for a continuous process giving a high yield with a minimum amount of loss by the formation of undesirable products.

A further object is to enable the use of comparatively inexpensive solvents which are less volatile and less explosive.

The older process for the manufacture of aldehyde ammonia consisted in dissolving acetaldehyde in acetic ether and then passing into the mixture gaseous ammonia, cooling by suitable means being effected. Aldehyde ammonia forms and, being insoluble in ether, it separates out in crystalline form.

According to the present invention, the chosen aldehyde and ammonia are brought together in a solvent preferably cheaper than ether, in which the aldehyde ammonia is more or less insoluble and from which the aldehyde ammonia will separate in crystalline form after saturation of the solvent with the aldehyde ammonia. The process is made continuous by circulating the liquor from the reaction zone through any suitable filtering apparatus which will remove aldehyde ammonia crystals, leaving a clear liquor saturated with aldehyde ammonia, which may be returned to the reaction zone. The reaction itself is exothermic and the heat evolved is removed to a sufficient extent to keep the liquor below the temperature at which resinification would take place.

The solvents used according to this invention are the esters, preferably the acetic esters, of alcohols, such as methyl acetate, ethyl acetate, amyl acetate, vinyl acetate or even the chosen aldehyde itself. The formic acid esters are also found suitable for the purpose. The ammonia may be used in gaseous form or in solution. In the same way, while acetaldehyde is preferred, the reaction may be carried out with other aliphatic aldehydes such as propylaldehyde, butylaldehyde or amylaldehyde or even with the aldehydes of higher alcohols. The chosen aldehyde and ammonia may be in any suitable physical condition, that is to say, either gaseous or liquid. The chosen aldehyde and ammonia are preferably brought together in approximately equimolecular amounts and the solvent liquor preferably agitated for well known reasons. The reaction is preferably carried out in a water or brine cooled kettle and the introduction of the aldehyde and ammonia regulated, so that the evolved heat is not beyond the capacity of the cooling means. The temperature is not in any case allowed to rise above 40° to 50° C. and is preferably maintained below 20° C.

After the reaction has proceeded a short time, the solvent liquor will be seen to contain a suspension of crystals and, when this suspension reaches a sufficient concentration, the liquor is circulated through a filter, which may be of a continuous type, and the saturated solvent thus freed from suspended aldehyde ammonia is returned continuously to the reaction. The crystalline aldehyde ammonia may now be dried by any suitable means such as by a centrifugal dryer and the saturated solvent recovered in the drying process also returned to the reaction according to any well known practice.

While the process is preferably carried out at atmospheric pressure, it will be understood that the invention is not thus limited, as the process may be carried on at either super-atmospheric or sub-atmospheric pressures.

The process is, as previously noted, a continuous one, the aldehyde and ammonia being continuously introduced at suitable rates and the saturated solvent continuously circulated through a filtering apparatus. The circulation need not be started at the commencement of the process but may be started when the suspension reaches the desired concentration. Therefore, the speed of circulation need only be such as to remove the aldehyde ammonia at substantially the rate that it is formed, so that any desired concentration of suspension may be maintained. Obviously, the removal of aldehyde ammonia occurs during the reaction.

The process may also be carried out as a batch process, the aldehyde and ammonia being continuously introduced, without filtering of the solvent, until the accumulation of aldehyde ammonia crystals reaches the desired degree, whereupon the aldehyde and ammonia introduction is stopped and the crystals filtered out. The solvent can then be used again.

To enable a better understanding of the invention, the following examples are given but it will be understood that the invention is in no way limited to the specific details of these examples:—

Example 1.

100 lbs. ethyl acetate is placed in a brine jacketed kettle, provided with an efficient agitator. Acetaldehyde is then run into the ethyl acetate in a slow stream and gaseous ammonia simultaneously blown in at such a rate as to maintain a distinct odor of ammonia. The rate of addition of the aldehyde is governed by the indications of a thermometer placed in the reaction liquor, which should not be allowed to rise above 30° C. but preferably not above 20° C. After a short interval the kettle will be seen to contain a suspension of crystals, and when this reaches the consistency of a thin cream the liquor is circulated through a filter which may be of a continuous type and the solvent, now freed from suspended aldehyde ammonia, returned continuously to the reaction vessel. The crystalline aldehyde ammonia may now be dried in a centrifugal or by other suitable means and the contained solvent recovered according to well known practice.

Example 2.

100 lbs. vinyl acetate may be substituted for ethyl acetate and the procedure given in example 1 followed.

Example 3.

100 lbs. acetaldehyde may be substituted for the solvent in example 1, in which case the temperature should be maintained below 10° C., and preferably about 0.° C. The rate of addition of fresh aldehyde must in this case be such as to maintain a constant level in the apparatus when the circulatory system is in operation whilst the ammonia input is governed by the temperature, which in turn depends upon the efficiency of heat transfer to the cooling medium.

With slight modifications necessary on account of the differing characteristics of the substances used, the process may be carried out substantially as explained in the examples with aldehydes other than acetaldehyde and using as a solvent the esters previously mentioned, also the aldehydes themselves. While only a small number of the aldehydes and solvents have been specifically referred to, it will be understood that the invention is not limited to the use of these specifically named bodies but applies to all bodies of the character named by means of which the reaction may be carried out. While the term "solvent" has been used for the reason that the medium in which the reaction takes place is preferably one in which the aldehyde used is largely or completely soluble or miscible, it will be understood that the solubility of the aldehyde in the reaction medium is not an absolute essential as long as sufficiently intimate contact can be obtained between the aldehyde and ammonia, for the reaction to take place efficiently, and as long as the aldehyde ammonia will crystallize in the solvent. In other words, if the aldehyde is insoluble in the medium and does not combine therewith or polymerize, the reaction will proceed if the aldehyde is sufficiently finely divided as, for example, by violent agitation.

In the following claims, the term "aldehyde" must therefore be construed as including any aliphatic aldehyde suitable for the purpose and the term "solvent" as including any ester suitable for the purpose, and also the aldehyde itself. In this connection, it is to be noted that while the reaction will take place if the aldehyde used as solvent is different from the aldehyde added, the product will obviously be a mixed aldehyde ammonia. For practical reasons, therefore, it is necessary that the aldehyde used as a solvent shall be the same aldehyde as is passed in.

It will be seen from the foregoing description that in cases where the aldehyde ammonia is soluble to any degree in the solvent, once the process is under way, it may be described as, passing the chosen aldehyde and ammonia into a saturated solution of the aldehyde ammonia which is being formed. No distinction has been made for the reason that the pure solvent and the solution are equally effective as a vehicle for the aldehyde. Therefore, in the following claims the term "solvent" is to be construed as including the solution.

Having thus described my invention, what I claim is;—

1. A process for the manufacture of an aldehyde ammonia, which comprises passing an aldehyde and ammonia into an organic liquid medium in which formed aldehyde ammonia is soluble, maintaining a temperature under 50° C. and after saturation of the medium separating out aldehyde ammonia precipitated from its saturated solution.

2. A process for the manufacture of an aldehyde ammonia, which comprises passing an aldehyde and ammonia into a solution of the aldehyde ammonia from which the product separates in a crystalline form, while maintaining a temperature below 50° C. and separating the crystals from the solution.

3. A process according to claim 1, in which the temperature of reaction is maintained below 50° C. by external cooling.

4. A process of making an aldehyde ammonia, which comprises bringing together an aldehyde and ammonia in a liquid ester, and absorbing the heat of reaction to maintain a temperature under 50° C.

5. A process of making acetaldehyde ammonia, which comprises bringing together acetaldehyde and ammonia in a suitable organic solvent for aldehyde ammonia and from which acetaldehyde ammonia separates in crystalline form, and maintaining a temperature below 50° C.

6. A process according to claim 5, in which the temperature is maintained below 50° C. by external cooling and by regulating the introduction of acetaldehyde and ammonia.

7. A process of making an aldehyde ammonia, which comprises passing an aldehyde and ammonia in substantially equimolecular proportions into ethyl acetate, and maintaining a temperature not above 50° C.

8. A continuous process according to claim 7, having the additional step of continuously removing the aldehyde ammonia from the ethyl acetate by continuously circulating the same through a filtering apparatus.

9. A process according to claim 7, in which the temperature is maintained by external cooling and by regulating the introduction of aldehyde and ammonia.

10. A process of making acetaldehyde ammonia, which comprises passing acetaldehyde and ammonia into a liquid ester and maintaining the temperature of reaction below 50° C.

11. A process of making acetaldehyde ammonia, which comprises passing acetaldehyde and ammonia in substantially equimolecular proportions into ethyl acetate, and maintaining a temperature not above 50° C.

In witness whereof, I have hereunto set my hand.

HOWARD W. MATHESON.